(No Model.)
J. N. CLOUSE.
VEHICLE WHEEL.
No. 366,620. Patented July 12, 1887.
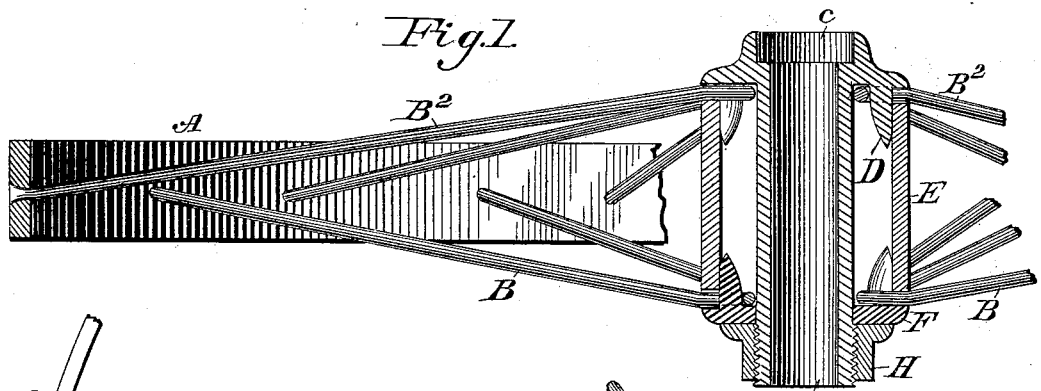
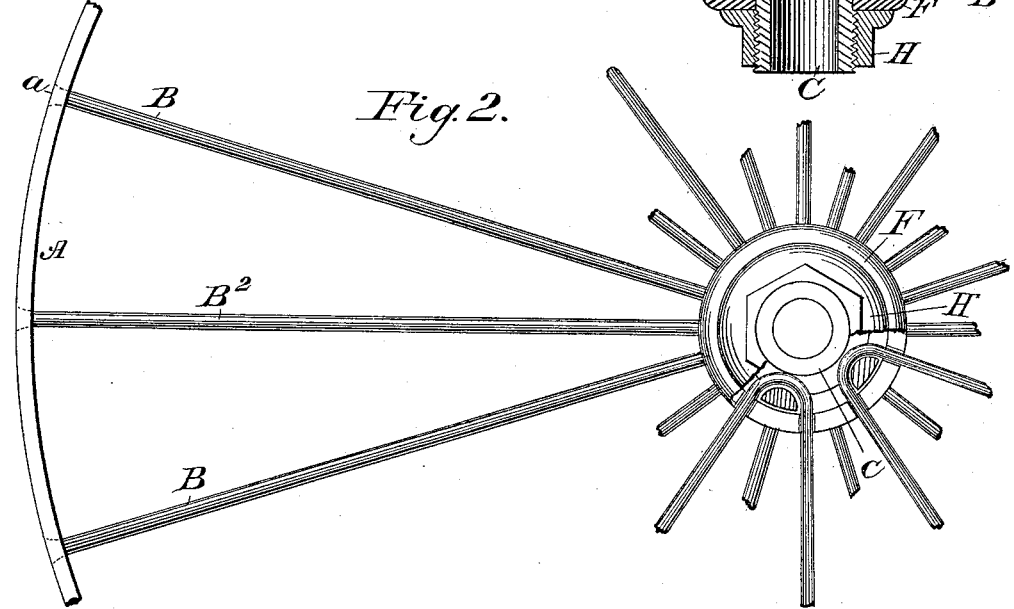
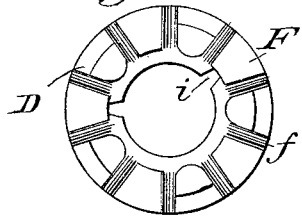
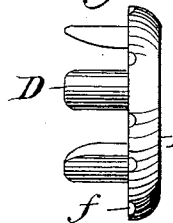
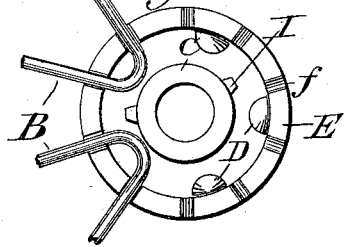
Witnesses:
Clarence C. Manly
Noah Clouse
Inventor:
Joseph N. Clouse

UNITED STATES PATENT OFFICE.

JOSEPH N. CLOUSE, OF TOLEDO, OHIO.

VEHICLE-WHEEL.

SPECIFICATION forming part of Letters Patent No. 366,620, dated July 12, 1887.

Application filed June 17, 1886. Serial No. 205,511. (No model.)

*To all whom it may concern:*

Be it known that I, JOSEPH N. CLOUSE, a citizen of the United States, residing at Toledo, in the county of Lucas and State of Ohio, have invented new and useful Improvements in Wheels for Vehicles and other Uses, of which the following is a specification.

My invention relates to improvements in metal wheels for vehicles, and especially such wheels as are used for children's carriages and velocipedes and bicycles; and the special object of my invention is to construct a metal hub for wheels (such as are usually termed "suspension-wheels") so that all of the parts composing the hub may be cast in such a manner that there will be no labor in fitting it up but boring out the box and tapping and threading the nut and box. Second, my object is to provide a wheel that can be easily repaired and easily finished up for nice work, the size of wheel and number of spokes being varied to suit the work on which it is to be used. I attain these objects by the mechanism illustrated in the drawings, and in the manner hereinafter described.

In the drawings, Figure 1 is a longitudinal center section of the hub with a section of the rim. Fig. 2 is a front side view of the hub with a section of the rim. Fig. 3 is an end view of the sleeve-box, and showing the position of the spokes. Figs. 4 and 5 are side and edge views of the head-flange. In all of which views like letters refer to like parts.

C is a box terminating at one end in a sand-band, c, and provided at the other end with a thread to receive a nut, H. A flange also extends out from the box C, having a series of arms or wedges, D D, &c. The exterior of the box C is provided with one or more projecting ribs or stops, I. A loose flange, F, which has a hole in it which fits the exterior of the box C, and an opening also in it to receive the stop I, is provided also with a series of arms or wedges D D, &c., and each flange also is provided with a series of grooves, *f*, on the inside.

The spokes B B are the usual return-spokes, two in one, the ends of which are riveted at *a a* in the rim or felly A and return around the arms or wedges D D.

E is a sleeve having grooves in the ends of it which correspond to the grooves *f* in the flanges F, &c. The interior of the sleeve E fits over the exterior of the arms or wedges D D, the inclined backs of the arms D D serving to tighten up the spokes B B by being forced in, and the nut H tightened, so as to bring the flanges up solid against the sleeve E.

I design to vary the size of the hub and the number of spokes to suit the size of the wheel and the strength required. In case a spoke is broken, the wheel can be repaired by removing the nut H and the box C, if desired, and replacing them again when desired, the whole forming a neat, strong, cheap, and compact wheel.

Having thus described my invention, what I claim as new, and desire to secure by Letters Patent, is—

1. In a metal wheel for vehicles and other uses, the box C, with its sand-band *c*, flange and arms or wedges D D, &c., in combination with the nut H and flange F, with its arms or wedges D D, &c., substantially as described and specified.

2. In a metal wheel for vehicles and other uses, the box C, with its sand-band *c*, flange and arms or wedges D D, &c., stop I, nut H, flange F, with its arms or wedges D D, &c., and the grooves *f f*, &c., in combination with the spokes B B and B² B² and felly A, substantially as set forth.

3. In a metal wheel for vehicles and other uses, the combination of the box C, sand-band *c*, flange and arms D D, grooves *f f*, nut H, flange F, and arms D D and grooves *f f*, sleeve E and grooves *f f*, and spokes B B and B² B², and felly A, all substantially as and for the purpose specified.

In testimony whereof I have hereunto set my hand in the presence of two subscribing witnesses.

JOSEPH N. CLOUSE.

Witnesses:
C. S. CURTIS,
J. A. CHASE.